United States Patent
Nakajima et al.

(10) Patent No.: US 12,298,534 B2
(45) Date of Patent: May 13, 2025

(54) PROJECTION SYSTEM

(71) Applicant: JVCKENWOOD Corporation, Yokohama (JP)

(72) Inventors: Nobuki Nakajima, Yokohama (JP); Hiroyuki Takada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 348 days.

(21) Appl. No.: 17/468,727

(22) Filed: Sep. 8, 2021

(65) Prior Publication Data

US 2022/0091431 A1    Mar. 24, 2022

(30) Foreign Application Priority Data

Sep. 24, 2020    (JP) .................................. 2020-160243

(51) Int. Cl.
G02B 30/23    (2020.01)

(52) U.S. Cl.
CPC .................. *G02B 30/23* (2020.01)

(58) Field of Classification Search
CPC ........ G02B 30/00; G02B 30/20; G02B 30/22; G02B 30/23; G02B 2027/0178; H04N 13/332; H04N 13/334; H04N 13/324; H04N 9/3164; H04N 9/3155; H04N 9/3158; H04N 9/3161; G03B 21/2033; G03B 21/2013; G03B 21/26; G03B 35/20; G03B 35/26

USPC ............................................. 359/464
See application file for complete search history.

(56) References Cited

U.S. PATENT DOCUMENTS

| | | | |
|---|---|---|---|
| 2019/0141291 A1* | 5/2019 | McNelley | H04N 9/3185 |
| 2019/0242539 A1* | 8/2019 | Roberts | F21S 8/006 |

FOREIGN PATENT DOCUMENTS

| | | | | |
|---|---|---|---|---|
| JP | 03-222204 | | 10/1991 | |
| JP | 2009259458 A | * | 11/2009 | ........... F21S 9/02 |
| JP | 5159404 | | 3/2013 | |
| JP | 2019-537742 | | 12/2019 | |
| WO | WO-03024269 A1 | * | 3/2003 | ........... A45D 42/10 |
| WO | WO-2018064194 A1 | * | 4/2018 | ........... G02B 30/23 |

* cited by examiner

*Primary Examiner* — Jyotsna V Dabbi
(74) *Attorney, Agent, or Firm* — Amin, Turocy & Watson, LLP

(57) ABSTRACT

A projection system includes a projection device configured to simultaneously project a first image light for a first image and a second image light for a second image; an eyeglass-type device which is to be worn by a user and configured to include a first optical module configured to transmit the first image light projected by the projection device and a second optical module configured to transmit the second image light projected by the projection device; and at least one light source unit configured to emit a source light of wavelengths that are in a visible light band and have a transmittance equal to or less than a predetermined value in both the first optical module and the second optical module.

3 Claims, 5 Drawing Sheets

PROJECTION SYSTEM

CROSS-REFERENCE TO RELATED APPLICATION

This application claims priority from Japanese Application No. 2020-160243, filed on Sep. 24, 2020, the contents of which are incorporated by reference herein in its entirety.

FIELD

The present application relates to a projection system.

BACKGROUND

A technology is known that provides a facility, for example, a movie theater, with light source units such as guide lights (refer to, for example, Japanese Patent No. 5159404).

For example, Japanese Patent No. 5159404 discloses a technology in which a facility includes a projection device and light source units, a wavelength of a light of each of the light source units can be switched between a first wavelength light that is less noticeable in a peripheral vision and a second wavelength light that is more noticeable in the peripheral vision, and in an emergency situation, the wavelength of the light of each of the light source units is switched to the second wavelength light so that the light source units are noticeable in the facility.

In the meantime, in a facility such as a movie theater, an eyeglass-type device is sometimes used to view three-dimensional stereoscopic images. The light source units are preferred to be recognized by a user using the eyeglass-type device even when images are projected by the projection device. However, when the light from the light source unit is noticeable, the projected images would be difficult for the user to be visually recognized.

SUMMARY

A projection system is disclosed.

According to one aspect, there is provided a projection system comprising: a projection device configured to simultaneously project a first image light for a first image and a second image light for a second image; an eyeglass-type device which is to be worn by a user and configured to include a first optical module configured to transmit the first image light projected by the projection device and a second optical module configured to transmit the second image light projected by the projection device; and at least one light source unit configured to emit a source light of wavelengths that are in a visible light band and have a transmittance equal to or less than a predetermined value in both the first optical module and the second optical module.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Referring to the accompanying drawings attached hereto, the following describes embodiments of the projection system according to the present application in detail. The present application is not limited by the following embodiments.

Embodiment

Projection System 10

Figure 1:
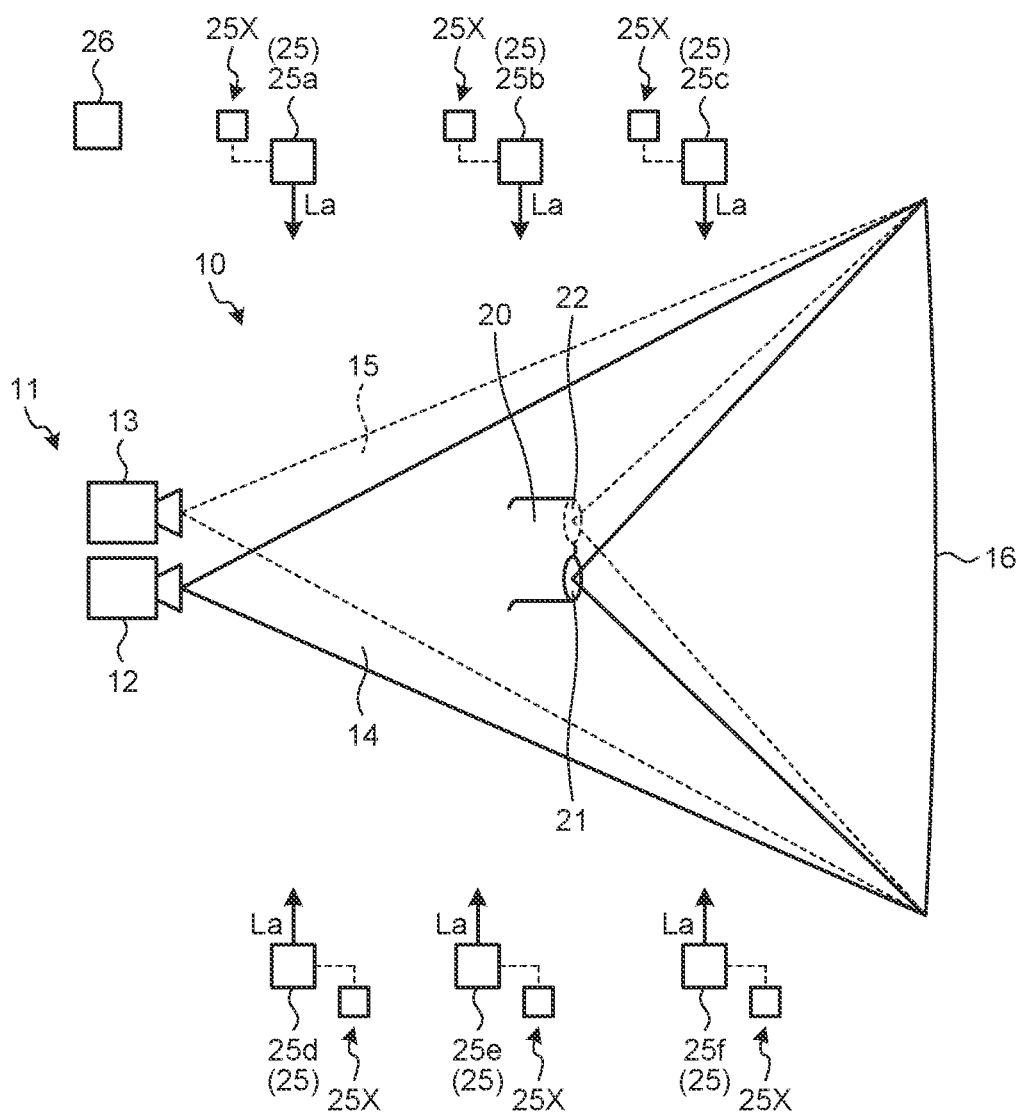
FIG. 1 is a schematic diagram illustrating a projection system according to an embodiment.

FIG. 1 is a schematic diagram illustrating a projection system according to one embodiment. The projection system 10 illustrated in FIG. 1 is a system for projecting images and is used to represent three-dimensional images, for example. The projection system 10 is disposed in a facility such as a movie theater. The facility in which the projection system 10 is provided is provided with multiple seats (not illustrated in FIG. 1) for users to sit on. The facility in which the projection system 10 is provided is not limited to a movie theater, but may be any facility.

The projection system 10 includes a projection device 11, a projection screen 16, an eyeglass-type device 20, and light source units 25a to 25f.

Projection Device

The projection device 11 is a projector that displays images by projecting light of wavelengths in a visible light band on the projection screen 16. The projection screen 16 may be of any structure and shape as long as light from the projection device 11 can be projected thereon. In the embodiment, the projection device 11 includes a projection unit 12 that emits a first image light 14 for a first image and a projection unit 13 that emits a second image light 15 for a second image. The projection device 11 emits the first image light 14 for the first image and the second image light 15 for the second image from the projection units 12 and 13 toward the projection screen 16, thereby projecting the first image light 14 and the second image light 15 simultaneously on the projection screen 16. The first image light 14 is for displaying the first image that is visible to one of the eyes of the user. The second image light 15 is for displaying a second image that is visible to the other eye of the user. The first image light 14 and the second image light 15 are light of wavelengths in the visible light band, and it is preferable that the wavelengths thereof differ from each other. The visible light band refers to a range of the wavelengths of the visible light. For example, the wavelength band thereof may be equal to or greater than 360 nm and less than 830 nm.

In more detail, the projection device 11 emits the first image light 14 and the second image light 15 so as to align an edge of the image of the first image light 14 (first image) and an edge of the image of the second image light 15 (second image) projected on the projection screen 16 with each other. A difference in an angle of view of the two images as the first image and the second image projected on the projection screen 16 corresponds to a visual parallax of the user. The first image and the second image are associated with the right eye and the left eye respectively when the user uses the eyeglass-type device 20

Eyeglass-Type Device

The eyeglass-type device 20 is an apparatus that is to be worn by the user and includes optical modules configured to transmit at least a portion of the light projected by the projection device 11. In more detail, the eyeglass-type device 20 has a first optical module 21 and a second optical module 22. The first optical module 21 is a translucent member that is placed at a position corresponding to one of the eyes of the user (the right eye in the example of FIG. 1) when the user wears the eyeglass-type device 20. The first optical module 21 transmits a light of at least some wavelengths included in the first image light 14 projected by the projection device 11. The second optical module 22 is a translucent member that is placed at a position corresponding to the other eye of the user (the left eye in the example of FIG. 1) when the user wears the eyeglass-type device 20. The second optical module 22 transmits a light of at least some wavelengths included in the second image light 15 projected by the projection device 11. The first image light 14 projected by the projection device 11 can be said to be the first image light 14 emitted by the projection device 11 and reflected by the projection screen 16, and the second image light 15 projected by the projection device 11 can be said to be the second image light 15 emitted by the projection device 11 and reflected by the projection screen 16. The first image light 14 projected by the projection device 11 passes through the first optical module 21 and enters one of the eyes of the user, and the second image light 15 projected by the projection device 11 passes through the second optical module 22 and enters the other eye of the user. This allows the user to visually recognize the image of the first image light 14 (first image) and the image of the second image light 15 (second image) as a combined three-dimensional image. The eyeglass-type device 20 is preferred to have a size that allows the eyeglass-type device 20 to be mounted over regular corrective glasses.

Figure 2:
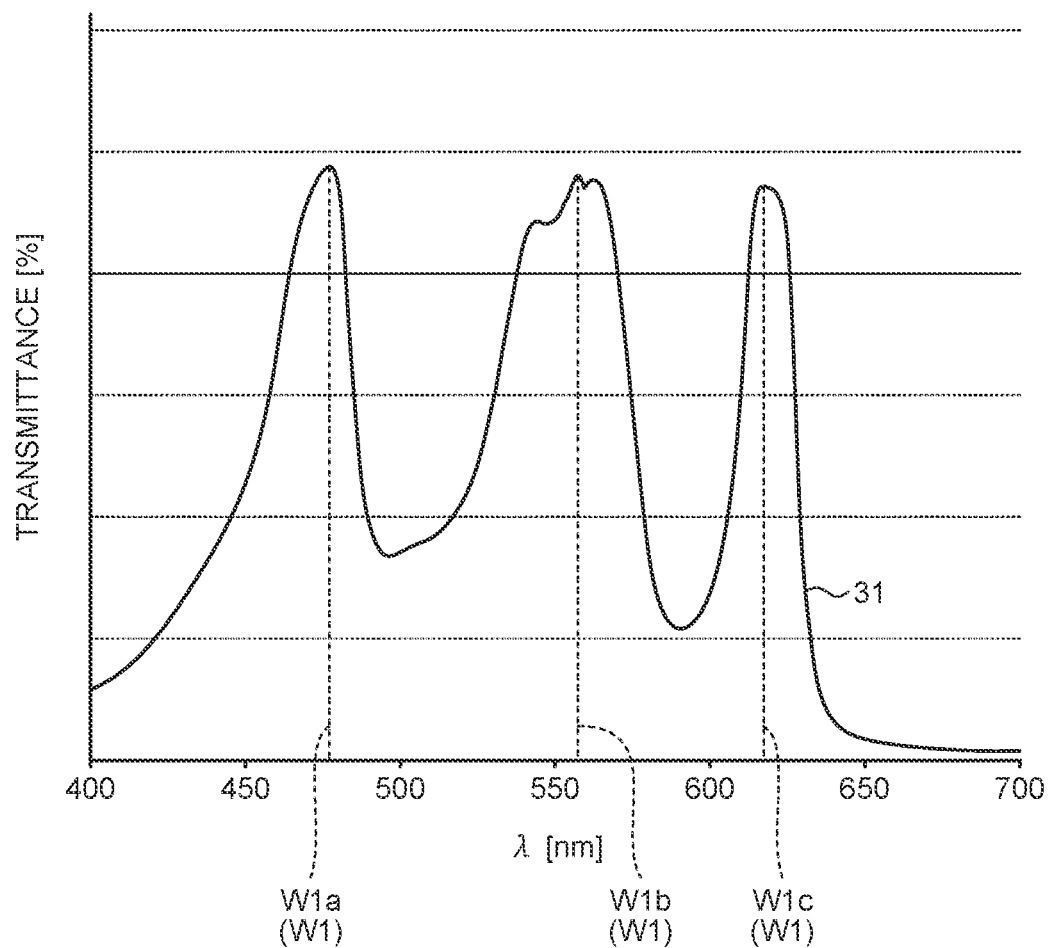
FIG. 2 is a graph representing an example of a light transmittance characteristic of a first optical module.

FIG. 2 is a graph representing an example of a light transmittance characteristic of the first optical module 21. A horizontal axis in FIG. 2 is the wavelength of the light, and a vertical axis is a transmittance of the first optical module 21. In other words, FIG. 2 represents an example of the light transmittance of the first optical module 21 for each wavelength. The first optical module 21 has an optical filter characteristic in which the light transmittance is different for each wavelength in the visible light band. In more detail, the first optical module 21 has the optical filter characteristic in which the transmittance has a peak (maximal value) at a predetermined peak wavelength. More specifically, the first optical module 21 has the optical filter characteristic in which the transmittance has multiple peaks (maximal values) in predetermined wavelengths. In the embodiment, the first optical module 21 has the optical filter characteristic such that the light transmittance at each of the wavelengths draw a curve 31. As represented by the curve 31, the first optical module 21 has the optical filter characteristic in which the transmittance has the multiple peaks (maximal values) when the wavelength of the light is a peak wavelength $W1a$, a peak wavelength $W1b$, and a peak wavelength $W1c$. The peak wavelength $W1a$, the peak wavelength $W1b$, and the peak wavelength $W1c$ are longer in this order. The peak wavelength $W1a$ corresponds to the wavelength of, for example, a blue light, the peak wavelength $W1b$ corresponds to the wavelength of, for example, a green light, and the peak wavelength $W1c$ corresponds to the wavelength of, for example, a red light. The peak wavelength $W1a$ is about 475 nm, the peak wavelength $W1b$ is about 560 nm, and the peak wavelength $W1c$ is about 620 nm, but the values of the peak wavelengths $W1a$, $W1b$, and $W1c$ are not limited thereto. The optical filter characteristic of the first optical module 21 is not limited to the example represented by the curve 31. For example, the number of the peak wavelengths of the first optical module 21 is not limited to three. The first optical module 21 is preferred to have the optical filter characteristic with the multiple peak wavelengths. Hereinafter the peak wavelength of the first optical module 21 is referred to as the peak wavelength W1 as appropriate.

Figure 3:
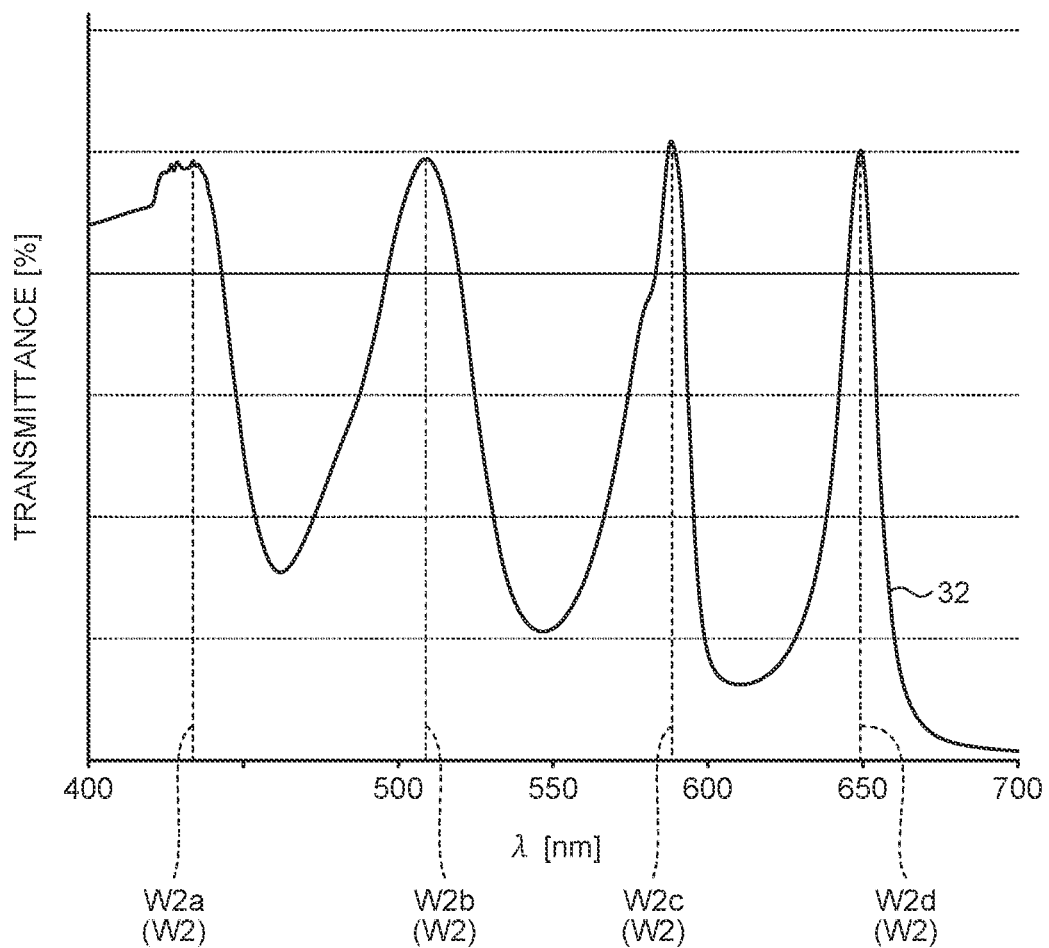
FIG. 3 is a graph representing an example of a light transmittance characteristic of a second optical module.

FIG. 3 is a graph representing an example of a light transmittance characteristic of the second optical module 22. A horizontal axis in FIG. 3 is the wavelength of the light, and a vertical axis is the transmittance of the second optical module 22. In other words, FIG. 3 represents an example of the light transmittance of the second optical module 22 for each wavelength. The second optical module 22 has an optical filter characteristic in which the light transmittance is different for each wavelength in the visible light band. In more detail, the second optical module 22 has the optical filter characteristic in which the transmittance has a peak (maximal value) at a predetermined peak wavelength. More specifically, the second optical module 22 has the optical filter characteristic in which the transmittance has multiple peaks (maximal values) in predetermined wavelengths. In the embodiment, the second optical module 22 has the optical filter characteristic in which the light transmittance at each of the wavelengths draws a curve 32. As represented by the curve 32, the second optical module 22 has the optical filter characteristic in which the transmittance has the peaks (maximal values) when the wavelength of the light is a peak wavelength $W2a$, a peak wavelength $W2b$, a peak wavelength $W2c$, and a peak wavelength $W2d$. The peak wavelength $W2a$, the peak wavelength $W2b$, the peak wavelength $W2c$, and the peak wavelength $W2d$ are longer in this order. The peak wavelength $W2a$ corresponds to the wavelength of, for example, a blue light, the peak wavelengths $W2b$ and $W2c$ correspond to the wavelength of, for example, a green light, and the peak wavelength $W2d$ corresponds to the wavelength of, for example, a red light. For example, the peak wavelength $W2a$ is about 425 nm, the peak wavelength $W2b$ is about 510 nm, the peak wavelength $W2c$ is about 590 nm, and the peak wavelength $W2d$ is about 650 nm, but the values of the peak wavelengths $W2a$, $W2b$, $W2c$, and $W2d$ are not limited thereto. The optical filter characteristic of the second optical module 22 are not limited to the example represented by the curve 32. For example, the number of peak wavelengths of the second optical module 22 is not limited to four. The second optical module 22 is preferred to have the optical filter characteristic with the multiple peak wavelengths. Hereinafter the peak wavelength of the second optical module 22 is referred to as the peak wavelength W2 as appropriate.

More specifically, the transmittance of the second optical module 22 at each wavelength is set differently from the transmittance of the first optical module 21 at each wavelength. In the embodiment, the peak wavelength W2 of the second optical module 22 is set differently from the peak wavelength W1 of the first optical module 21. In other words, the optical filter characteristics of the first optical module 21 and the second optical module 22 are set such that their peak wavelengths are different (shifted) from each other.

Thus, the first optical module 21 and the second optical module 22 are set such that the transmittances thereof at each wavelength are different from each other. The wavelengths of the first image light 14 and the second image light 15 are set based on the transmittances (optical filter characteristics) of the first optical module 21 and the second optical module 22 at each wavelength. That is, the wavelengths of the first image light 14 and the second image light 15 are set such that an image is visually recognized by the user as a three-dimensional image when the first image light 14 projected by the projection device 11 passes through the first optical module 21 and enters one of the eyes of the user, and the second image light 15 projected by the projection device 11 passes through the second optical module 22 and enters the other eye of the user.

Light Source Unit

Each of the light source units 25a to 25f illustrated in FIG. 1 is a light source that emits a source light La of wavelengths different from those of the light from the projection device 11 (in this case, the first image light 14 and the second image light 15). Each of the light source units 25a to 25f emits the source light La while the projection units 12 and 13 are emitting the first image light 14 and the second image light 15. Each of the light source units 25a to 25f may be of any configuration, and, for example, may include a light-emitting element such as a light-emitting diode (LED). In the facility in which the projection system 10 is installed, the light source units 25a to 25f are disposed in areas excluding the projection screen 16, that is, disposed at positions that do not overlap the projection screen 16. In the embodiment, the light source units 25a to 25f are used to communicate information, which is not related to the image projected on the projection screen 16, to people in the facility. For example, the light source units 25a to 25f are used as guide lights to indicate corners of aisles and entrances/exits. In the example of FIG. 1, six light source units are provided, but the number of light source units is any number and may be one or more. In the following, the light source units 25a to 25f are referred to as the light source unit 25 as appropriate when they do not need to be distinguished.

Figure 4:
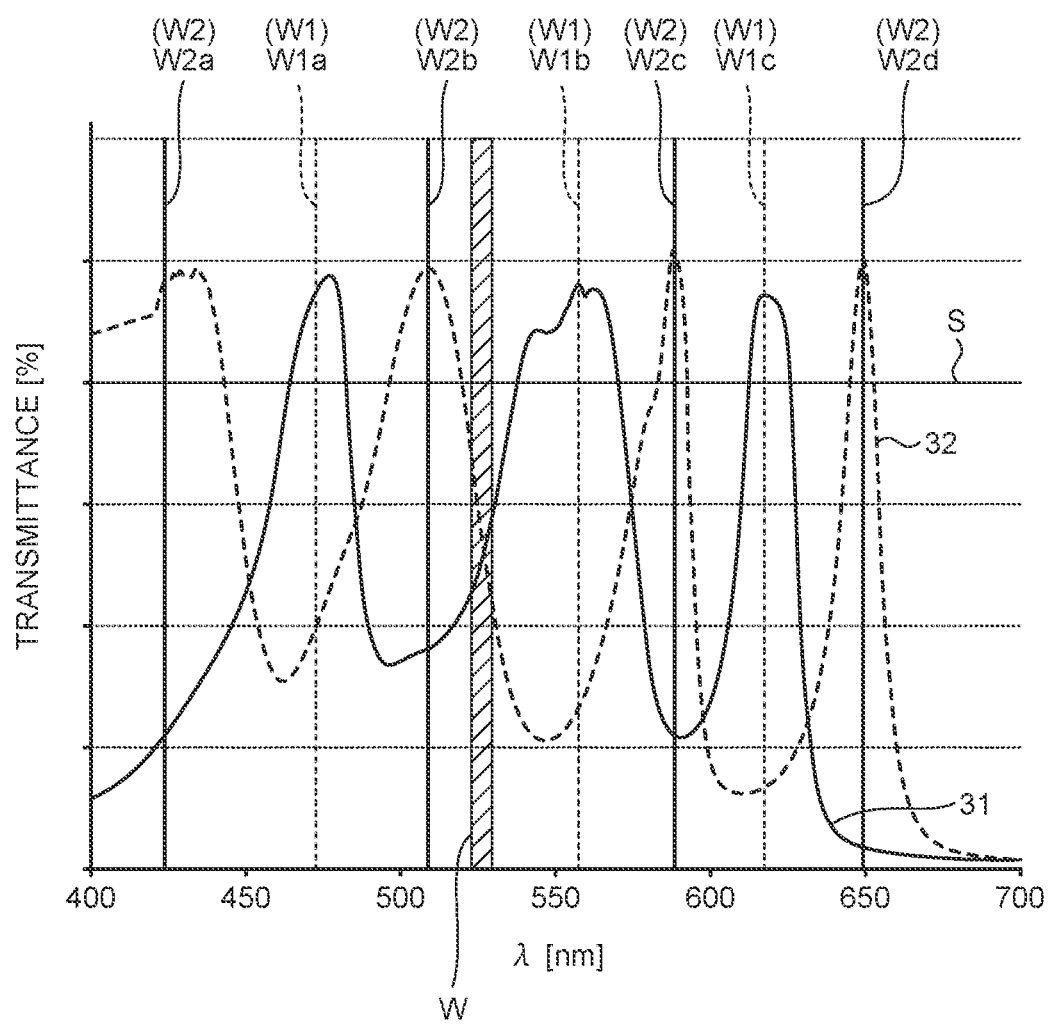
FIG. 4 is a graph representing an example of the light transmittance characteristics of the first optical module and the second optical module with wavelengths of source lights.

FIG. 4 is a graph representing an example of the light transmittance characteristic of the first optical module 21 and the second optical module 22 with the wavelengths of the source light. A horizontal axis in FIG. 4 is the wavelength of light, and a vertical axis is the light transmittance. As mentioned above, the curve 31 is the transmittance of the first optical module 21 at each wavelength, and the curve 32 is the transmittance of the second optical module 22 at each wavelength.

The light source unit 25 emits the source light La of the wavelengths within a boundary wavelength band W represented in FIG. 4. The light source unit 25 may emit a light of a single wavelength within the boundary wavelength band W as the source light La, or a light of multiple wavelengths within the boundary wavelength band W as the source light La. The boundary wavelength band W is a wavelength band in the visible light band. The boundary wavelength band W is a wavelength band in which the transmittance of the light of the wavelengths within the boundary wavelength band W is equal to or less than a predetermined value S in the first optical module 21 and the second optical module 22. In other words, it can be said that the light source unit 25 emits the source light La of the wavelengths that are in the visible light band and have the transmittance equal to or less than the predetermined value S in both the first optical module 21 and the second optical module 22. The predetermined value S may be any value, but for example, it may be equal to or greater than 0% and less than 50%. Thus, the transmittance of the source light La is equal to or less than the predetermined value S in both the first optical module 21 and the second optical module 22, and thereby the source light La from the light source unit 25 is at least partially blocked by the first optical module 21 and the second optical module 22, so that the source light La is less likely to reach the eyes of the user wearing the eyeglass-type device 20.

The boundary wavelength band W is set such that the transmittance of the light in the boundary wavelength band W in the first optical module 21 is lower than the transmittance of the first image light 14 in the first optical module 21, and the transmittance of the light in the boundary wavelength band W in the second optical module 22 is lower than the transmittance of the second image light 15 in the second optical module 22. Therefore, the source light La from the light source unit 25 is less likely to reach the eyes of the user wearing the eyeglass-type device 20 than the light from the projection device 11 is.

As represented in FIG. 4, the boundary wavelength band W is preferred to be a wavelength band between the peak wavelength W1 of the first optical module 21 and the peak wavelength W2 of the second optical module 22. In other words, it can be said that the light source unit 25 emits the light of the wavelengths between the peak wavelength W1 and the peak wavelength W2 as the source light La. Furthermore, the boundary wavelength band W is preferred to be a wavelength band between the peak wavelength W1 and the peak wavelength W2 adjacent to each other on the horizontal axis in FIG. 4. The wording, the peak wavelength W1 and the peak wavelength W2 adjacent to each other on the horizontal axis in FIG. 4, means that there are no other peak wavelengths between the peak wavelength W1 and the peak wavelength W2. Specifically, for example, there are no other peak wavelengths between the peak wavelength W2b and the peak wavelength W1b in FIG. 4, and thus it can be said that the peak wavelength W2b and the peak wavelength W1b are adjacent to each other on the horizontal axis in FIG. 4. In the example of FIG. 4, the boundary wavelength band W is located between the peak wavelength W2b and the peak wavelength W1b, which correspond to wavelengths of green, for example. The boundary wavelength band W represented in FIG. 4 is an example and is not limited to the example in FIG. 4. For example, the boundary wavelength band W may be a wavelength band between the peak wavelength W2a and the peak wavelength W1a, between the peak wavelength W1a and the peak wavelength W2b, between the peak wavelength W1b and the peak wavelength W2c, between the peak wavelength W2c and the peak wavelength W1c, or between the peak wavelength W1c and the peak wavelength W2d.

Figure 5:
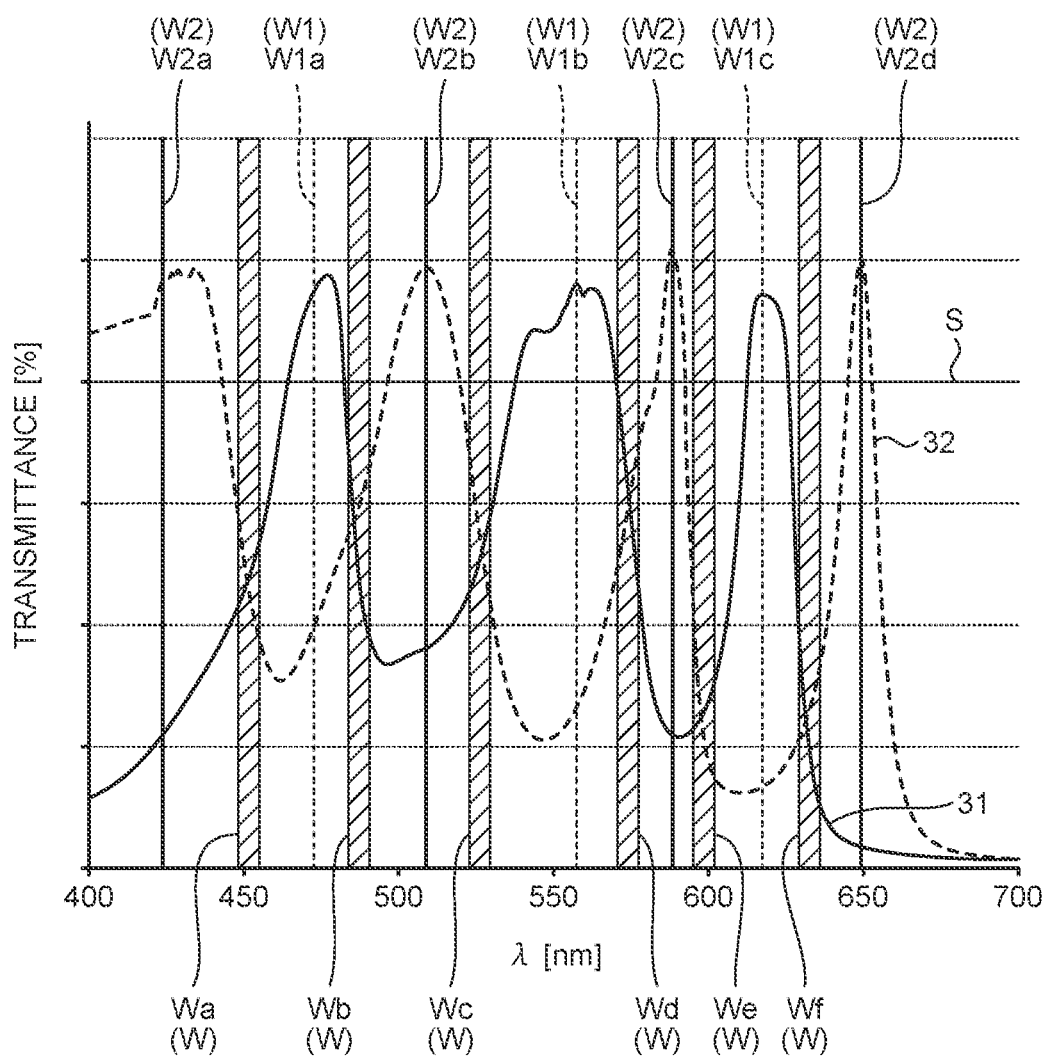
FIG. 5 is a graph representing an example of the light transmittance characteristics of the first optical module and the second optical module with the wavelengths of the source lights.

FIG. 5 is a graph representing an example of the light transmittance characteristic of the first optical module 21 and the second optical module 22 with the wavelengths of the source light. In the example of FIG. 4, there is one boundary wavelength band W. However, as represented in FIG. 5, multiple boundary wavelength bands W may be set. In this case, the light source unit 25 may, for example, emit a light of wavelengths within each of the boundary wavelength bands W as the source light La. In the example of FIG. 5, the boundary wavelength bands Wa to Wf are set as the boundary wavelength bands W. In this case, the source light La may include a light of wavelengths within the boundary wavelength band Wa, a light of wavelengths within the boundary wavelength band Wb, a light of wavelengths within the boundary wavelength band Wc, a light of wavelengths within the boundary wavelength band Wd, a light of wavelengths within the boundary wavelength band We, and a light of wavelengths within the boundary wavelength band Wf. The boundary wavelength band Wa is a wavelength band between the peak wavelength W2a and the peak wavelength W1a, the boundary wavelength band Wb is a wavelength band between the peak wavelength W1a and the peak wavelength W2b, the boundary wavelength band Wc is a wavelength band between the peak wavelength W2b and the peak wavelength W1b, the boundary wavelength band Wd is a wavelength band between the peak wavelength W1b and the peak wavelength W2c, the boundary wavelength band We is a wavelength band between the peak wavelength W2c and the peak wavelength W1c, and the boundary wavelength band Wf is a wavelength band between the peak wavelength W1c and the peak wavelength W2d. That is, it can be said that there is at least one peak wavelength between each of the boundary wavelength bands Wa to Wf. In other words, the boundary wavelength bands W are separated from each other by a certain value (wavelength) or more, and there is at least one peak wavelength between the boundary wavelength bands W. The number of the boundary wavelength bands W and the range of the boundary wavelength bands W represented in FIG. 5 are an example.

Thus, the light source unit 25 in the embodiment emits the source light La of the wavelengths that are within the boundary wavelength bands W and have a transmittance equal to or less than the predetermined value S in the first optical module 21 and the second optical module 22. Accordingly, when the user wearing the eyeglass-type device 20 visually recognizes the images of the light projected from the projection units 12 and 13, the source light La from the light source unit 25 is less likely to transmit through the first optical module 21 and the second optical module 22, so that the source light La is less likely to reach the eyes of the user. This prevents the projected image from becoming difficult for the user to visually recognize. It is also assumed that there is a case where the user needs to be caused to visually recognize the source light La from the light source unit 25 even when the projection units 12 and 13 are projecting images, for example, in a case where the user checks the guide lights to exit the facility. In such a case, the user takes off the eyeglass-type device 20, and the source light La is no longer blocked, so that the user can visually recognize the source light La properly. Thus, the projection system 10 according to the embodiment can cause the source light La to be visibly recognized properly as needed, for example, without switching the wavelengths or an intensity of the source light La depending on conditions, while preventing the projected image from becoming difficult to be visually recognized.

When the multiple light source units 25 are provided, the wavelength of each of the source light La may be different for each light source unit 25 according to locations in which the light source units 25 are provided. In this case, for example, the boundary wavelength band W used as the wavelength band of the source light La may be different for each light source unit 25. The boundary wavelength band W used as the wavelength band of the source light La refers to a boundary wavelength band W the range of which includes the wavelengths of the source light La. For example, the light source unit 25 disposed farther away from the projection screen 16 may have a larger number of the boundary wavelength bands W used as the wavelength bands of the source light La, and the light source unit 25 disposed closer to the projection screen 16 may have a smaller number of the boundary wavelength bands W used as the wavelength bands of the source light La. As the number of the boundary wavelength bands W to be used increases, the color of the source light La becomes closer to white, so that the source light La becomes noticeable to the users. Therefore, by reducing the number of the boundary wavelength bands W of the light source unit 25 near the projection screen 16, the effect on the projected image can be reduced, so that the projected image can be prevented from becoming difficult to be visually recognized. The light source unit 25 has less effect on the projected image as it is disposed away from the projection screen 16. Therefore increasing the number of the boundary wavelength bands W of the light source unit 25 away from the projection screen 16 can cause the source light La to be visually recognized properly while reducing the effect on the projected image. An entrance/exit of the facility is usually located away from the projection screen 16. Accordingly, it can be said that the light source unit 25 disposed away from the projection screen 16 is the light source unit 25 disposed near the entrance/exit of the facility.

For example, the light source unit 25 disposed away from the projection screen 16 may have the wavelength of the light source La closer to the green light wavelength band, and the light source unit 25 disposed closer to the projection screen 16 may have the wavelength of the source light La closer to the blue light wavelength band. Because the green light is easy for the users to visually recognize, and the blue light is difficult for the users to visually recognize, the same effect can be achieved. The wavelength range of the green light is, for example, equal to or greater than 495 nm and less than 570 nm, and the wavelength range of the blue light is, for example, equal to or greater than 450 nm and less than 495 nm.

Wavelength Switching

The light source unit 25 may change the wavelength of the source light La. For example, the light source unit 25 may switch the wavelength of the source light La within one boundary wavelength band W. The light source unit 25 may switch the boundary wavelength band W used as the wavelength band of the light source La, or may change the number of the boundary wavelength bands W used as the wavelength bands of the source light La. That is, for example, the light source unit 25 may switch the source light La from the light of the wavelengths within the boundary wavelength band Wa to the light of the wavelengths within the boundary wavelength band Wb, or from the light of the wavelengths within the boundary wavelength band Wa to the light that includes the light of the wavelengths within the boundary wavelength band Wa and the light of wavelengths within the boundary wavelength band Wb.

When switching the wavelength of the source light La in this way, a controller 25X that controls the wavelength of the light source unit 25 is preferred to be provided, as illustrated in FIG. 1. The controller 25X is an arithmetic device, that is, a central processing unit (CPU) in the embodiment, but it is not limited thereto and may be a circuit, for example. In the example of FIG. 1, the controller 25X is provided to each of the light source units 25, but is not limited thereto, and the controller 25X may be a device to control the multiple light source units 25. The light source unit 25 may be provided with multiple light-emitting elements with different wavelengths of light emission, or may be provided with a semiconductor component that causes the light-emitting elements to emit the light of the different wavelengths. The controller 25X may change the wavelength of the light source unit 25 by switching the light-emitting elements caused to emit the light or controlling the semiconductor component.

In the above-described explanation, the light source unit 25 emits the source light La of the wavelengths within the boundary wavelength band W, and switching of the wavelengths is performed within the boundary wavelength band W. However, the light source unit 25 may switch from the source light La to a sub-source light Lb of the wavelengths outside the range of the boundary wavelength band W. It can be said that the sub-source light Lb is a light of the wavelengths that have a higher transmittance than that of the source light La in both the first optical module 21 and the second optical module 22. Therefore, it is easier for a viewer wearing the eyeglass-type device 20 to visually recognize the sub-source light Lb than to visually recognize the source light La. An example of switching to the sub-source light Lb is described below.

As an example, the light source unit 25 may change the wavelengths of the light to be emitted according to a projection state of the projection device 11. Specifically, the light source unit 25 switches the light to be emitted between the source light La and the sub-source light Lb according to the projection state of the projection device 11. The light source unit 25 emits the source light La when the projection device 11 is in the projecting state, that is, while the projection device 11 is emitting the first image light 14 and the second image light 15. On the other hand, the light source unit 25 emits the sub-source light Lb when the projection device 11 is in a non-projecting state, that is, while the projection device 11 is not emitting the first image light 14 or the second image light 15. In this case, for example, the controller 25X may obtain information indicating the projection state of the projection device 11. Having been obtained the information that the projection device 11 is in the projecting state, the controller 25X causes the light source unit 25 to emit the source light La. Having been obtained the information that the projection device 11 is in the non-projecting state, the controller 25X causes the light source unit 25 to emit the sub-source light Lb.

When the projection device 11 is not projecting the image, the necessity to cause the light from the light source unit 25 to be less noticeable is reduced. Therefore, by causing the source light La, which is less noticeable to the user wearing the eyeglass-type device 20, to be emitted when the projection device 11 is projecting an image, and causing the sub-source light Lb to be emitted when the projection device 11 is not projecting an image, the light source unit 25 can be appropriately operated according to the projection state.

As another example, the light source unit 25 may change the wavelengths of the light to be emitted according to a condition of the facility provided with the projection system 10. In this case, the projection system 10 is preferably provided with a sensor 26 that detects the condition of the facility provided with the projection system 10. In the embodiment, the sensor 26 detects an emergency situation in the facility. The emergency situation may be, for example, a fire or an earthquake. The light source unit 25 emits the source light La when the sensor 26 has not detected the emergency situation, that is, when the emergency situation does not occur. On the other hand, the light source unit 25 switches from the source light La to the sub-source light Lb when the sensor 26 has detected the emergency situation. When the sensor 26 has detected the emergency situation, the light source unit 25 switches to the sub-source light Lb even when the projection device 11 is in the projecting state.

When the emergency situation has occurred in the facility, it is assumed that the user may forget to take off the eyeglass-type device 20 even though the user wants to visually recognize the light from the light source unit 25. In this case, the user may be unable to visually recognize the light from the light source unit 25. In contrast to that, by switching to the sub-source light Lb in the emergency situation, the projection system 10 can cause the user to visually recognize the light from the light source unit 25 even when the user does not take off the eyeglass-type device 20.

Effect

As described above, according to the embodiment, each of the light source units 25a to 25f emits the source light La of the wavelengths that are in the visible light band and have the transmittance equal to or less than the predetermined value S in both the first optical module 21 and the second optical module 22. With this configuration, the source light La of each of the light source units 25a to 25f that emits the light in the boundary wavelength band W is less likely to transmit through the first optical module 21 and the second optical module 22, is less likely to adversely affect the image projected by the projection device 11 as an extra light from the user's peripheral vision, and is therefore not noticeable. Therefore, it is possible to prevent the projected image from becoming difficult to be visually recognized. It is also assumed that there is a case where the user needs to be caused to visually recognize the source light La from the light source unit 25 even when the projection units 12 and 13 are projecting images, for example, when the user checks the guide lights to exit the facility. In such a case, the user takes off the eyeglass-type device 20, and the source light La is no longer blocked, so that the user can visually recognize the source light L properly.

According to the embodiment, the first optical module 21 and the second optical module 22 have the different light transmittances depending on the wavelengths, and the peak wavelengths W1 and W2 that are the wavelengths at which the transmittance have peaks are different from each other. Each of the light source units 25a to 25f emits, as the source light La, the light of the wavelengths adjacent to each other between the peak wavelength W1 of the first optical module 21 and the peak wavelength W2 of the second optical module 22. With this configuration, the source light La of the light source units 25a to 25f that emit the light in the boundary wavelength band W is less likely to transmit through the first optical module 21 and the second optical module 22, is less likely to adversely affect the image projected by the projection device 11 as the extra light from the user's peripheral vision, and is therefore not noticeable. Therefore, it is possible to prevent the projected image from becoming difficult to be visually recognized.

According to the embodiment, the light source units 25a to 25f emit, as the source light La, the light of the multiple wavelengths having transmittance equal to or less than the predetermined value S in both the first optical module 21 and the second optical module 22. In other words, the light source units 25a to 25f are capable of simultaneously emitting the light in the boundary wavelength bands W. With this configuration, the light source units 25a to 25f can emit the light in various boundary wavelength bands W within the visible light band. This allows, even when it is difficult for the user to visually recognize the light in some of the boundary wavelength bands W in the visible light band, the user to visually recognize the light in other boundary wavelength bands W. This ensures that the user can recognize the light source units 25a to 25f in the case of emergency.

According to the embodiment, the light source units 25a to 25f may emit the light in at least one of the boundary wavelength bands W. With this configuration, the source light La of the light source units 25a to 25f that emit the light in at least one of the boundary wavelength bands W, using the boundary wavelength bands W with the less numbers, is less likely to adversely affect the image projected by the projection device 11 as the extra light from the user's peripheral vision, and is therefore not noticeable.

According to the embodiment, each of the light source units 25a to 25f can change the wavelengths of the light to be emitted according to the projection state of the projection device 11. This allows the source light La of the light source units 25a to 25f, for example, to have the wavelength of the light that is less likely to adversely affect the projected image, in the projecting state of the projection device 11 than in the non-projecting state. In addition, for example, by reducing the wavelength of the source light La of the light source units 25a to 25f as the projecting state of the projection device 11 is dark, the source light La of the light source units 25a to 25f can be less likely to adversely affect the projected image.

In other words, according to the embodiment, each of the light source units 25a to 25f can change the wavelengths of the light to be emitted according to the projecting state or the non-projecting state of the projection device 11. With this configuration, each of the source light La of the light source units 25a to 25f, for example, has the wavelength of the light that is less likely to adversely affect the projected image in the projecting state of the projection device 11 than in the non-projecting state.

According to the embodiment, each of the light source units 25a to 25f can emit the source light La when the projection device 11 is in the projecting state, and can emit the sub-source light Lb that is the light of the wavelengths having a higher transmittance in both the first optical module 21 and the second optical module 22 than that of the source light La when the projection device 11 is in the non-projecting state. With this configuration, the light source units 25a to 25f are easily recognized by the user, in the non-projecting state of the projection device 11.

According to the embodiment, when the sensor 26 has detected the emergency situation, the light source units 25a to 25f switch the light to be emitted from the source light La to the sub-source light Lb that is the light of the wavelengths having a higher transmittance in both the first optical module 21 and the second optical module 22 than that of the source light La. With this configuration, the light source units 25a to 25f can switch the light in response to the detection of the emergency situation by the sensor 26. In addition, the sub-source light Lb is noticeable even when the user is wearing the eyeglass-type device, and therefore, the light source units 25a to 25f are easily recognized by the user even when the user forgets to take off the eyeglass-type device in the non-projecting state of the projection device 11 when the sensor 26 has detected the emergency situation.

According to the embodiment, the light source units 25a to 25f may simultaneously emit the light in all the boundary wavelength bands W in the non-projecting state of the projection device 11, and may emit the light in some of the wavelength ranges among the boundary wavelength bands W in the projecting state of the projection device 11. With this configuration, the light in all the boundary wavelength bands W within the visible light band becomes close to white and noticeable, so that the light source units 25a to 25f are easily recognized by the user, in the non-projecting state of the projection device 11.

According to the embodiment, the light source units 25a to 25f may emit the light in a low wavelength range in the projecting state of the projection device 11. With this configuration, the light in the low-wavelength range is bluish and less noticeable, so that the source light La from the light source units 25a to 25f is less likely to adversely affect the image projected by the projection device 11 as the extra light from the user's peripheral vision during the projection, and is not noticeable during the projection.

According to the embodiment, the multiple light source units 25a to 25f disposed away from the projection screen 16 on which the first image light 14 and the second image light 15 are projected may have a larger number of the wavelength bands of the source light La, and the light source units 25a to 25f disposed closer to the projection screen 16 may have a smaller number of the wavelength bands of the source light La. With this configuration, the light source units 25a to 25f disposed closer to the projection screen 16 have the source light La that is less noticeable, so that, for a large number of users using the eyeglass-type devices 20 in the facility, the light of the light source units 25a to 25f specifically nearer the projection screen 16 is less noticeable during the projection.

Others

The configuration of the projection system 10 is implemented, for example, as software, a method of operating the projection system 10, or a computer program that is loaded into memory and executed by a computer operating the projection system 10. The above-described embodiment has been explained as hardware and functional blocks implemented by the coordination of the aforementioned pieces of hardware or software. However, the functional blocks installed in the hardware can be implemented in various ways by hardware alone, software alone, or a combination of hardware and software.

The present application exerts an effect in which a projected image can be prevented from becoming difficult to visually recognize.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A projection system comprising:
a projection device configured to simultaneously project a first image light for a first image and a second image light for a second image on a projection screen;
an eyeglass-type device which is to be worn by a user and configured to include a first optical module configured to transmit the first image light projected by the projection device and a second optical module configured to transmit the second image light projected by the projection device;
light source units configured to emit, in a direction different from a direction of the projection screen, a source light of wavelengths that are in a visible light band and have a transmittance equal to or less than a predetermined value in both the first optical module and the second optical module; and
a controller configured to control a wavelength of the source light and to obtain information indicating a projection state of the projection device, wherein
a first light source unit of the light source units disposed closer to the projection screen has the wavelength closer to a wavelength band which is difficult for the user to visually recognize, and a second light source unit of the light source units disposed away from the projection screen has the wavelength closer to a wavelength band which is easy for the user to visually recognize, the light source units are further configured to:
  reduce the wavelength of the source light as a projecting state of the projection device is dark; and
  emit a sub-source light of a wavelength having a higher transmittance in both the first optical module and the second optical module than the transmittance of the source light when the controller obtains information indicating that the projection device is in a non-projecting state, wherein the projection system further comprises a sensor configured to detect an emergency situation in a facility provided with the projection system, wherein when the sensor detects the emergency situation, the light source units are further configured to switch the light to be emitted from the source light to the sub-source light of the wavelength having the higher transmittance in both the first optical module and the second optical module than the transmittance of the source light.

2. The projection system according to claim 1, wherein the transmittance of the first optical module and the transmittance of the second optical module are different from each other according to the wavelength, and a peak wavelength of the first optical module and a peak wavelength of the second optical module, the peak wavelength being the wavelength at which the transmittance has a peak, are different from each other, and the light source units are further configured to emit, as the source light, a light of the wavelength between the peak wavelength of the first optical module and the peak wavelength of the second optical module.

3. The projection system according to claim 1, wherein the light source units disposed away from the projection screen on which the first image light and the second image light are projected have a larger number of wavelength bands of the source light to make the source light closer to white, and the light source units disposed closer to the projection screen have a smaller number of wavelength bands of the source light.

* * * * *